United States Patent
Hoecker et al.

(10) Patent No.: US 10,903,522 B2
(45) Date of Patent: Jan. 26, 2021

(54) PHOSPHONATE BASED LITHIUM COMPLEXES

(71) Applicant: BASF SE, Ludwigshafen am Rhein (DE)

(72) Inventors: Johannes David Hoecker, Ludwigshafen (DE); Manuel Alejandro Mendez Agudelo, Ludwigshafen (DE); Ryosuke Takeuchi, Amagasaki (JP); Frederick Francois Chesneau, Ludwigshafen (DE); Jinbum Kim, Amagasaki (JP); Kazuki Yoshida, Amagasaki (JP)

(73) Assignee: BASF SE, Ludwigshafen am Rhein (DE)

( * ) Notice: Subject to any disclaimer, the term of this patent is extended or adjusted under 35 U.S.C. 154(b) by 117 days.

(21) Appl. No.: 16/333,619

(22) PCT Filed: Sep. 11, 2017

(86) PCT No.: PCT/EP2017/072762
§ 371 (c)(1),
(2) Date: Mar. 15, 2019

(87) PCT Pub. No.: WO2018/054710
PCT Pub. Date: Mar. 29, 2018

(65) Prior Publication Data
US 2019/0252723 A1    Aug. 15, 2019

(30) Foreign Application Priority Data

Sep. 21, 2016 (EP) .................................. 16189962

(51) Int. Cl.
| | |
|---|---|
| *H01M 10/0567* | (2010.01) |
| *C07F 9/141* | (2006.01) |
| *C07F 9/6596* | (2006.01) |
| *C07F 9/48* | (2006.01) |
| *H01M 10/052* | (2010.01) |
| *H01M 10/0568* | (2010.01) |
| *H01M 10/0569* | (2010.01) |
| *C07F 9/535* | (2006.01) |
| *C07F 9/70* | (2006.01) |
| *C01B 25/00* | (2006.01) |
| *C07F 9/90* | (2006.01) |
| *H01M 10/0525* | (2010.01) |

(52) U.S. Cl.
CPC ......... *H01M 10/0567* (2013.01); *C01B 25/00* (2013.01); *C07F 9/1415* (2013.01); *C07F 9/4866* (2013.01); *C07F 9/535* (2013.01); *C07F 9/6596* (2013.01); *C07F 9/70* (2013.01); *C07F 9/90* (2013.01); *H01M 10/052* (2013.01); *H01M 10/0525* (2013.01); *H01M 10/0568* (2013.01); *H01M 10/0569* (2013.01); *H01M 2300/0025* (2013.01); *H01M 2300/0034* (2013.01)

(58) Field of Classification Search
CPC ..... H01M 10/0567; H01M 2300/0037; H01M 10/0525; H01M 10/052; H01M 10/0568; H01M 10/0569; H01M 2300/0025; H01M 2300/0034; H01M 4/62; C07F 9/535; C07F 9/70; C07F 9/90; C07F 9/4866; C07F 9/6596; C07F 9/1415; C01B 25/00; Y02E 60/10; C01D 15/005
See application file for complete search history.

(56) References Cited

U.S. PATENT DOCUMENTS

| | | | | | |
|---|---|---|---|---|---|
| 4,473,561 | A | * | 9/1984 | Ishiguri ................ | C07F 9/4816 514/114 |
| 4,701,209 | A | * | 10/1987 | Sasaki .................. | C07F 9/4816 504/190 |
| 8,277,973 | B2 | * | 10/2012 | Kawashima ...... | H01M 10/0567 429/203 |
| 8,734,668 | B2 | | 5/2014 | Bhat et al. | |
| 8,993,158 | B2 | | 3/2015 | Kobayashi et al. | |
| 2008/0032194 | A1 | * | 2/2008 | Nakai ................. | H01M 4/5825 429/218.1 |
| 2011/0274981 | A1 | * | 11/2011 | Yamada ................ | H01M 4/62 429/303 |
| 2012/0100436 | A1 | * | 4/2012 | Inoue ................ | H01M 10/0525 429/332 |
| 2012/0244419 | A1 | * | 9/2012 | Kwak .............. | H01M 10/0567 429/163 |
| 2013/0071732 | A1 | * | 3/2013 | Kobayashi .......... | H01M 10/052 429/200 |

(Continued)

FOREIGN PATENT DOCUMENTS

| | | |
|---|---|---|
| EP | 2 573 854 A1 | 3/2013 |
| EP | 3 054 521 A1 | 8/2016 |
| WO | WO 2013/026854 A1 | 2/2013 |

OTHER PUBLICATIONS

U.S. Appl. No. 16/333,431, filed Mar. 14, 2019, Mendez Agudelo, M.A., et al.

(Continued)

*Primary Examiner* — Muhammad S Siddiquee
(74) *Attorney, Agent, or Firm* — Obion, McClelland, Maier & Neustadt, L.L.P.

(57) ABSTRACT

Phosphonate based lithium complexes of formula (I) and their use in electrolyte compositions for electrochemical cells.

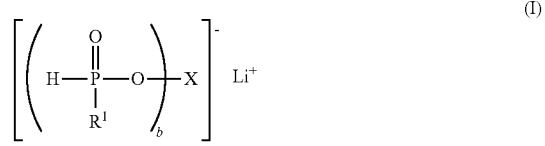

15 Claims, 3 Drawing Sheets

(56) References Cited

U.S. PATENT DOCUMENTS

Figure 1:
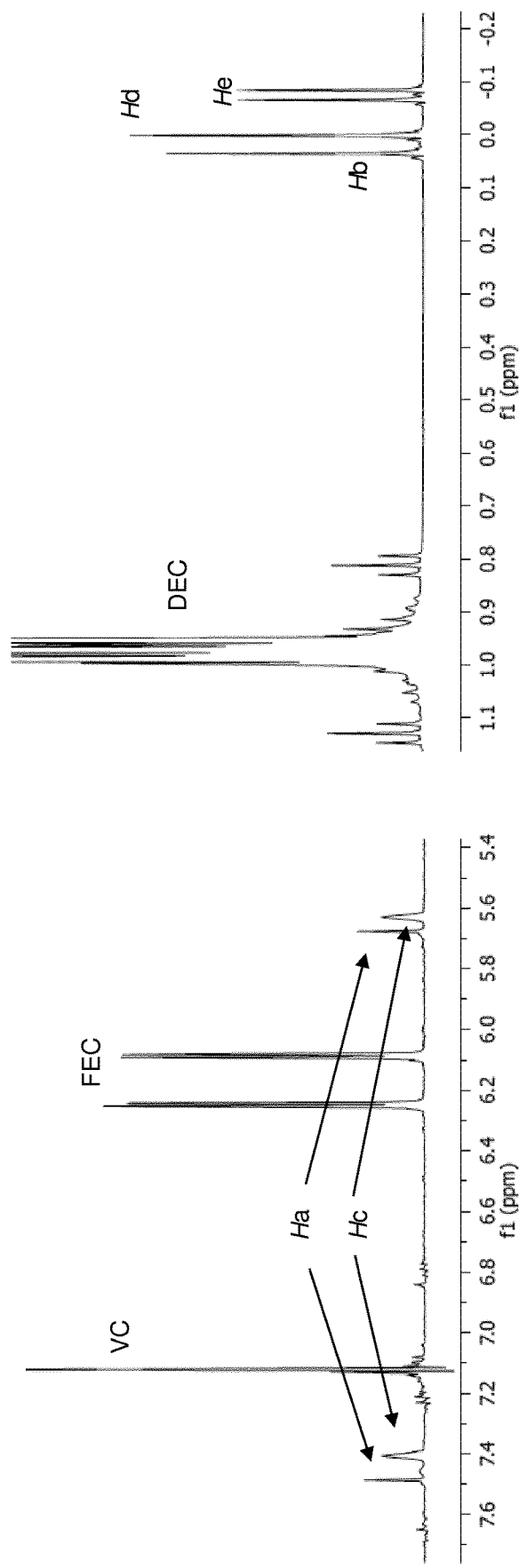

| | | | |
|---|---|---|---|
| 2013/0164604 A1 | 6/2013 | Matsumoto et al. | |
| 2013/0230771 A1* | 9/2013 | Deronzier | C07D 279/22 |
| | | | 429/200 |
| 2014/0023941 A1* | 1/2014 | Amine | H01M 12/02 |
| | | | 429/405 |
| 2015/0099193 A1 | 4/2015 | Hamasaki et al. | |
| 2015/0140332 A1* | 5/2015 | Boll | C01D 15/04 |
| | | | 428/402 |
| 2018/0342758 A1* | 11/2018 | Tang | H01M 4/5825 |

OTHER PUBLICATIONS

Extended European Search Report dated Nov. 25, 2016 in European Patent Application No. 16189962.0, 3 pages.

Elazari, R., et al., "Rechargeable lithiated silicon-sulfur (SLS) battery prototypes", Electrochemistry Communications, vol. 14, Issue 1, Jan. 2012, pp. 21-24.

Kerlau, M., et al., "Layered Nickel Oxide-Based Cathodes for Lithium Cells: Analysis of Performance Loss Mechanisms", Journal of the Electrochemical Society, vol. 152, Issue 8, 2005, 19 pages.

Rabinowitz, R., "The Reactions of Phosphonic Acid Esters with Acid Chlorides. A Very Mild Hydrolytic Route", Journal of Organic Chemistry, vol. 28, Issue 11, Nov. 1963, pp. 2975-2978.

Sekine, M., et al., "Silyl Phosphites. 15. Reactions of Silyl phosphites with .alpha.-halo carbonyl compounds. Elucidation of the mechanism of the Perkow reaction and related reactions with confirmed experiments", Journal of Organic Chemistry, vol. 46, Issue 10, 1981, pp. 2097-2107.

International Search Report dated Nov. 14, 2017 in PCT/EP2017/072762 filed Sep. 11, 2017.

\* cited by examiner

PHOSPHONATE BASED LITHIUM COMPLEXES

The present invention relates to phosphonate based lithium complexes of formula (I)

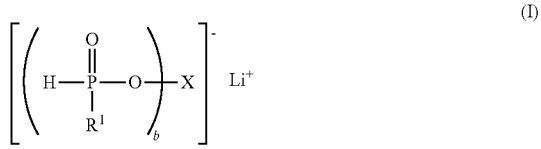

wherein $R^1$, X, and b are defined as below and their use in electrochemical cells.

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and film forming additives which react during first charge/discharge cycle on the electrode surface thereby forming a film on the electrode. Recently novel electrolyte additives were developed based on P-containing acid derivatives comprising additional functional groups.

U.S. Pat. No. 8,734,668 B2 describes electrolyte compositions comprising silicon containing compounds which may additionally contain hetero atoms like B, Al, P, S, F, Cl, Br, and I.

U.S. Pat. No. 8,993,158 B2 discloses electrolyte compositions for use in lithium ion batteries comprising silyl ester group-containing phosphonic acid derivatives to inhibit increase of the battery resistance and deterioration of the battery performance in a high-temperature environment.

US 2013/0164604 A1 refers to the use of phosphite esters, phosphonate esters and bisphosphonate esters as additives in electrolyte compositions for lithium ion batteries.

EP 3 054 521 A1 describes electrolyte compositions for use in lithium ion batteries based inter alia on a phosphonate, phosphite or carboxylate and comprising an O—PF$_5$—H or O—PF$_5$—Li group.

For increasing the performance of lithium batteries novel cathode active materials are used. These cathode active materials have higher specific energies and/or higher working voltages. Examples of such cathode active materials are high energy NCM (lithiated mixed oxides of Ni, Co and Mn, so-called HE-NCM), high voltage manganese spinels with layer structure containing additional transition metals and lithium nickel cobalt aluminium oxides (also named NCA). For some of these cathode active materials high cut-off voltages have to be used during charging to obtain the desired high specific energies. These cathode active materials place new demands on the electrolyte compositions used, e.g. in regard to stability towards high voltage, $O_2$ release, solvation of transition metal cations leading to metal dissolution, gas evolution upon storage, etc.

There is still the need for improving the performance of electrochemical cells, in particular the performance of electrochemical cells comprising the afore-mentioned cathode materials, e.g. in respect to high capacity retention, good long-term performance, high safety, reduced gas evolution, and decreased impedance build-up.

It is an objective of the present invention to provide additives for use in electrochemical cells to improve the performance of the electrochemical cells, e.g. in respect to high capacity retention, good long-term performance, high safety, reduced gas evolution, and decreased impedance build-up. In particular additives should be provided to improve the performance of electrochemical cells comprising cathode active materials having high specific energies and/or high working voltages. It is another object of the invention to provide electrolyte compositions for electrochemical cells, resulting in electrochemical cells with high capacity retention, good long-term performance and high safety. In particular electrolyte composition for the use with cathode active materials having high specific energies and/or high working voltages should be provided. It is also an object of the present invention to provide electrochemical cells showing high capacity retention, good long-term performance, high safety, reduced gas evolution, and decreased impedance build-up.

Accordingly, the complex compounds of formula (I) as defined below are provided:

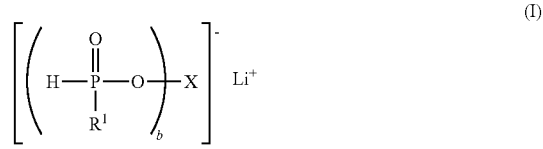

wherein
$R^1$ is selected from H, F, $R^2$, $OR^2$, $OSi(R^3R^4R^5)$, and O—X⁻Li⁺;
$R^2$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F;
$R^3$, $R^4$, and $R^5$ are independently from each other selected from H, F, $R^2$, $OR^2$, and $OSi(R^6)_3$;
$R^6$ is independently at each occurrence selected from H, F, $R^2$ and $OR^2$;
X is selected from $Y^1(R^7)_{4-b}$ and $Y^2(R^8)_{6-b}$;
$Y^1$ is B or Al;
$Y^2$ is P, Sb or As;
in case X is $Y^1$ b is an integer from 1 to 4;
in case X is $Y^2$ b is an integer from 1 to 6;

$R^7$ and $R^8$ are independently at each occurrence selected from F, $R^9$ and $OR^9$;
$R^9$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more F;
wherein one pair of $R^7$ or one or two pairs of $R^8$ may be combined and jointly be

forming a cycle with $Y^1$ or $Y^2$, respectively;

is a bidentate radical derived from a 1,2-, 1,3- or 1,4-diol, from a 1,2- or 1,3- or 1,4-dicarboxylic acid or from a 1,2-, 1,3- or 1,4-hydroxycarboxylic acid;
and wherein $R^1$ may be combined with one of $R^7$ or $R^8$, respectively, and jointly forming a cycle with the POX-group.

The complex compounds of formula (I) may be used as additives in electrochemical cells, e.g. as cathode or anode active additives. Furthermore, electrolyte compositions for electrochemical cells containing the complex compounds of formula (I) and electrochemical cells comprising said electrolyte composition containing a complex compound of formula (I) are provided. Such electrochemical cells exhibit good capacity retention, good long-term performance, decreased cell resistance and reduced gas generation.

Figure 2:
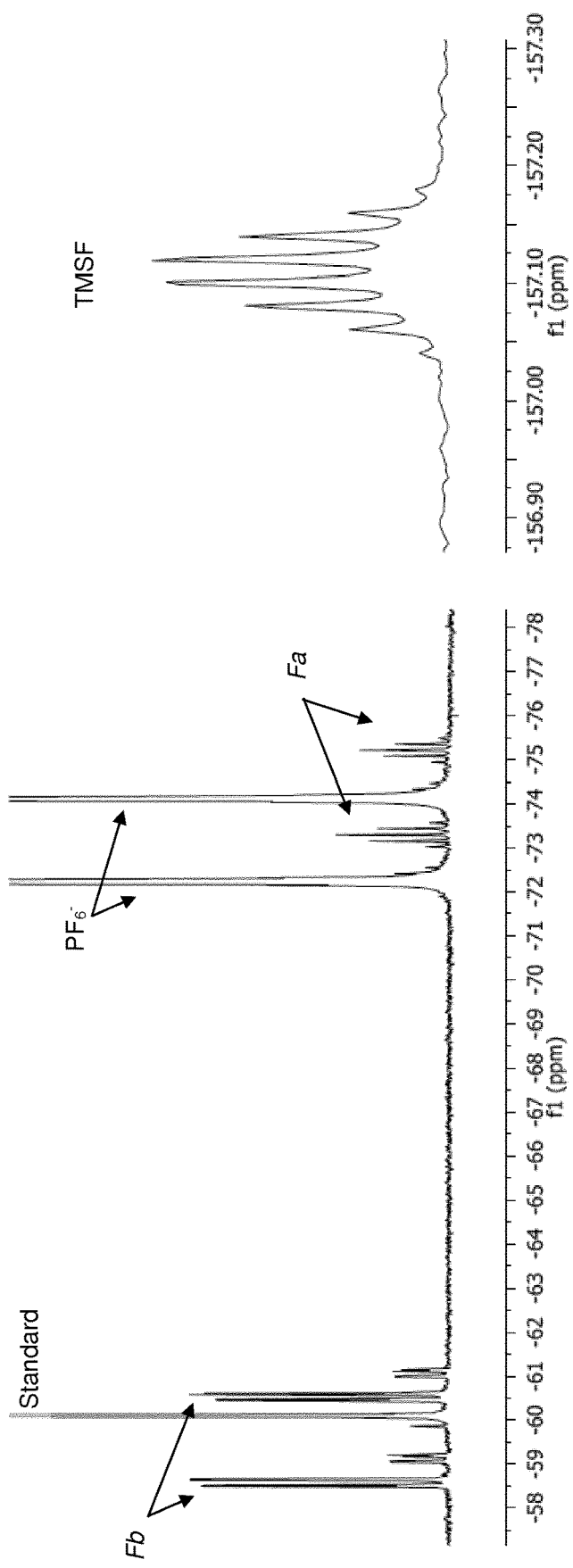
Figure 3:
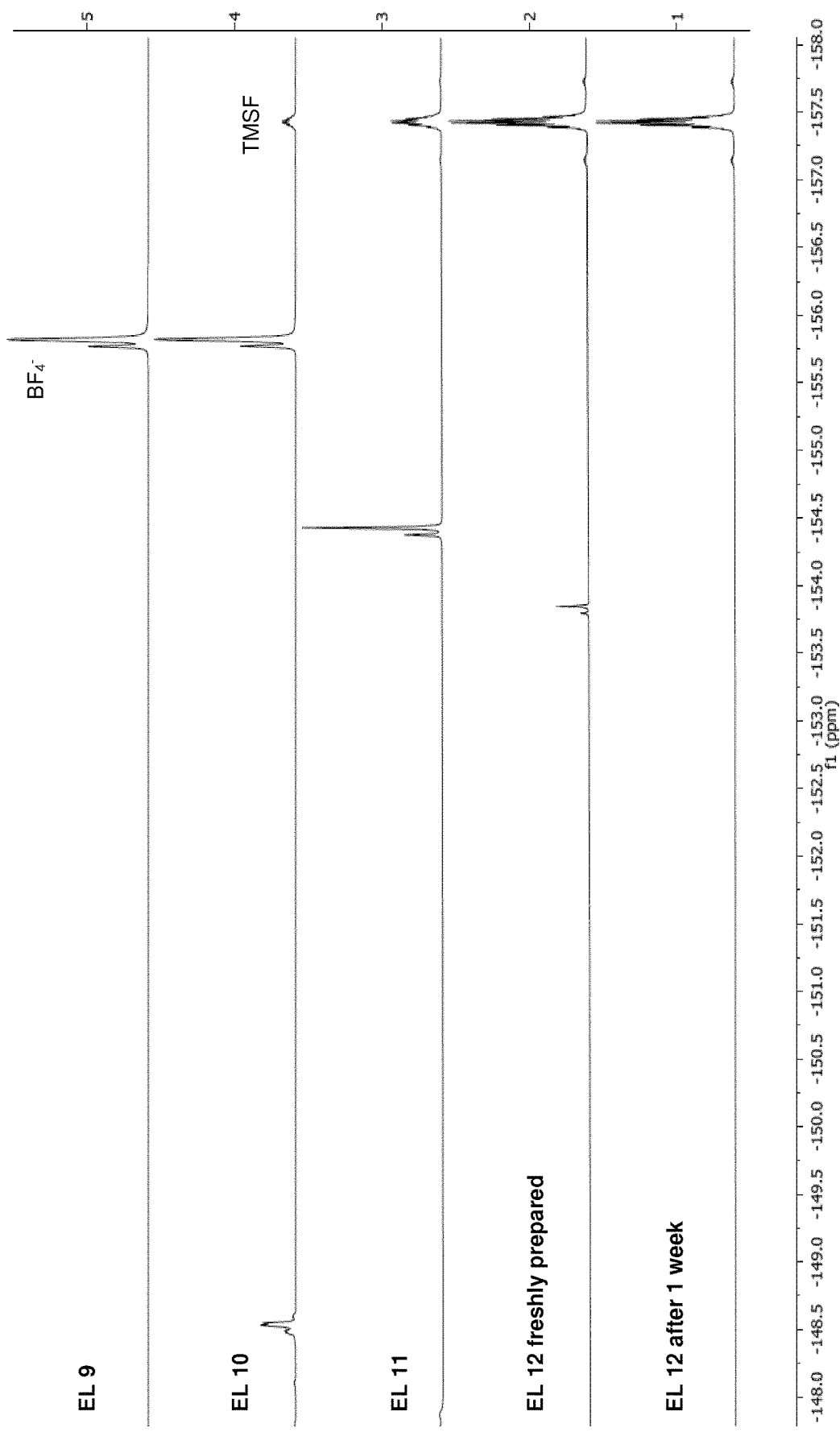

FIG. 1 shows parts of the 1H NMR spectrum of EL8
FIG. 2 shows a part of the 19F NMR spectrum of EL8.
FIG. 3 shows parts of the $^{19}$F NMR spectra of EL9, EL10, EL11 and EL12.

In the following the invention is described in detail.
A first aspect of the inventions are the complex compounds of formula (I)

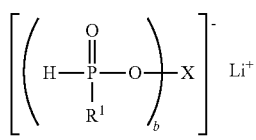

wherein
$R^1$ is selected from H, F, $R^2$, $OR^2$, $OSi(R^3R^4R^5)$, and $O$—$X^-Li^+$;
$R^2$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F;
$R^3$, $R^4$, and $R^5$ are independently from each other selected from H, F, $R^2$, $OR^2$, and $OSi(R^6)_3$;
$R^6$ is independently at each occurrence selected from H, F, $R^2$ and $OR^2$;
X is selected from $Y^1(R^7)_{4-b}$ and $Y^2(R^8)_{6-b}$;
$Y^1$ is B or Al;
$Y^2$ is P, Sb or As;
in case X is $Y^1$ b is an integer from 1 to 4;
in case X is $Y^2$ b is an integer from 1 to 6;

$R^7$ and $R^8$ are independently at each occurrence selected from F, $R^9$ and $OR^9$;
$R^9$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more F;
wherein one pair of $R^7$ or one or two pairs of $R^8$ may be combined and jointly be

forming a cycle with $Y^1$ or $Y^2$ respectively;

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid;
and wherein $R^1$ may be combined with one of $R^7$ or $R^8$, respectively, and jointly forming a cycle with the POX-group.

The term "$C_1$-$C_6$ alkyl" as used herein means a straight or branched saturated hydrocarbon group with 1 to 6 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, and the like. Preferred are $C_1$-$C_4$ alkyl, more preferred are methyl, ethyl, and n- and iso-propyl and most preferred is methyl.

The term "$C_2$-$C_6$ alkenyl" as used herein refers to an unsaturated straight or branched hydrocarbon group with 2 to 6 carbon atoms having one free valence. Unsaturated means that the alkenyl group contains at least one C=C double bond. $C_2$-$C_6$ alkenyl includes for example ethenyl, 1-propenyl, 2-propenyl, 1-n-butenyl, 2-n-butenyl, iso-butenyl, 1-pentenyl, 1-hexenyl, and the like. Preferred are $C_2$-$C_4$ alkenyl groups, more preferred are ethenyl and propenyl, most preferred is 1-propen-3-yl, also called allyl.

The term "$C_2$ to $C_6$ alkynyl" as used herein refers to an unsaturated straight or branched hydrocarbon group with 2 to 6 carbon atoms having one free valence, wherein the hydrocarbon group contains at least one C—C triple bond. $C_2$-$C_6$ alkynyl includes for example ethynyl, propynyl, 1-n-butinyl, 2-n-butynyl, iso-butinyl, 1-pentynyl, 1-hexynyl, and the like. Preferred are $C_2$-$C_4$ alkynyl, more preferred are ethynyl and 1-propyn-3-yl (propargyl).

The term "$C_5$ to $C_7$ (hetero)aryl" as used herein denotes an aromatic 5- to 7-membered hydrocarbon cycle or condensed cycles having one free valence wherein one or more of the C-atoms of the aromatic cycle(s) may be replaced independently from each other by a heteroatom selected from N, S, O and P. Examples of $C_5$-$C_7$ (hetero)aryl are pyrrolyl, furanyl, thiophenyl, pyridinyl, pyranyl, thiopyranyl, and phenyl. Preferred is phenyl.

The term "$C_6$-$C_{13}$ (hetero)aralkyl" as used herein denotes an aromatic 5- to 7-membered hydrocarbon cycle substituted by one or more $C_1$-$C_6$ alkyl wherein one or more of the C-atoms of the aromatic cycle may be replaced independently from each other by a heteroatom selected from N, S, O and P. The $C_6$-$C_{13}$ (hetero)aralkyl group contains in total 6 to 13 C— and heteroatoms and has one free valence. The free valence may be located in the aromatic cycle or in a $C_1$-$C_6$ alkyl group, i.e. $C_6$-$C_{13}$ (hetero)aralkyl group may be bound via the (hetero)aromatic part or via the alkyl part of the group. Examples of $C_6$—$O_{13}$ (hetero)aralkyl are methylphenyl, 2-methylpyridyl, 1,2-dimethylphenyl, 1,3-dimethylphenyl, 1,4-dimethylphenyl, ethylphenyl, 2-propylphenyl, benzyl, 2-$CH_2$-pyridyl, and the like.

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid. The bidentate radical is derived by abstracting two hydrogens from the two OH-groups present in the diol, hydroxycarboxylic acid or the dicarboxylic acid. Examples of suited diols, hydroxycarboxylic acids and dicarboxylic acids from which

may be derived are 1,2-dihydroxy benzene, salicylic acid, oxalic acid, malonic acid, maleic acid, and succinic acid. Abstracting two hydrogens from the two OH-groups in 1,2-, 1,3- or 1,4 from these molecules results in bidentate radicals which are called catecholato, salicylato, oxalato, malonato, maleato and succinato, respectively. Preferably

is derived from a 1,2-, 1,3- or 1,4-dicarboxylic acid, more preferred

is derived from oxalic acid, malonic acid, maleic acid, and succinic acid, in particular preferred from oxalic acid.

According to one embodiment of the invention X contains at least one

group derived from a 1,2-, 1,3- or 1,4-diol, from a 1,2- or 1,3- or 1,4-dicarboxylic acid or from a 1,2-, 1,3- or 1,4-hydroxycarboxylic acid, preferably X contains at least one

group derived from oxalic acid, maleic acid, malonic acid, or succinic acid, more preferred X contains at least one

group derived from oxalic acid. This embodiment is specially preferred if X is B or P, in particular if X is B and the third $R^7$ is F.

$R^1$ is selected from H, F, $R^2$, $OR^2$, $OSi(R^3R^4R^5)$, and O—$X^-Li^+$ and $R^1$ may be combined with one of the substituents of X, i.e. $R^1$ may be combined with one of $R^7$ or $R^8$ and jointly forming a cycle with the POX-group. Such cycles may e.g. be a 4-membered cycle wherein $R^1$ and $R^7$ or $R^8$, respectively, are jointly O or an 8-membered cycle wherein $R^1$ and $R^7$ or $R^8$, respectively, are jointly O—$PF_4$—O-PDX—O—$PF_4$—O.

$R^2$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F; preferably $R^2$ is selected from $C_1$-$C_6$ alkyl, which may be substituted by one or more substituents selected from $OSi(CH_3)_3$ and F.

$R^3$, $R^4$, and $R^5$ are independently from each other selected from H, F, $R^2$, $OR^2$, and $OSi(R^6)_3$. Preferably $R^3$, $R^4$, and $R^5$ are independently from each other selected from $R^2$, $OR^2$, and $OSi(R^6)$, more preferred $R^3$, $R^4$, and $R^5$ are independently from each other selected from $R^2$, even more preferred $R^3$, $R^4$, and $R^5$ are independently from each other selected from $C_1$-$C_6$ alkyl, which may be substituted by one or more substituents selected from $OSi(CH_3)_3$ and F, in particular preferred $R^3$, $R^4$, and $R^5$ are independently from each other selected from $C_1$-$C_4$ alkyl. $R^3$, $R^4$, and $R^5$ may be same or different, preferably $R^3$, $R^4$, and $R^5$ are same.

$R^6$ is independently at each occurrence selected from H, F, $R^2$ and $OR^2$. "independently at each occurrence" means, that each $R^6$ may be same or different from the other $R^6$ present. Preferably $R^6$ is independently at each occurrence selected from $R^2$ and $OR^2$, even more preferred $R^6$ is independently at each occurrence selected from $R^2$ and most preferred $R^6$ is independently at each occurrence selected from $C_1$-$C_4$ alkyl. The three $R^6$ present in the $OSi(R^6)_3$ group may be same or different, preferably the three $R^6$ are same.

Preferably $R^1$ is $R^2$, $OR^2$, $OSi(R^3R^4R^5)$ or O—$X^-Li^+$, more preferred $R^1$ is $R^2$, $OR^2$, $OSi(R^3R^4R^5)$ or O—$X^-Li^+$ wherein $R^2$ is $C_1$-$C_6$ alkyl which may be substituted by one or more substituents selected from $OSi(CH_3)_3$ and F. Even more preferred $R^1$ is selected from $R^2$, $OR^2$, $OSi(R^3R^4R^5)$ and O—$X^-Li^+$ wherein $R^3$, $R^4$, and $R^5$ are selected from H, F, $R^2$, $OR^2$, and $OSi(R^2{}_3)_3$ and $R^2$ is $C_1$-$C_6$ alkyl which may be substituted by one or more substituents selected from $OSi(CH_3)_3$ and F. Most preferred $R^1$ is $OSi(R^3R^4R^5)$ or O—$X^-Li^+$.

X is selected from $Y^1(R^7)_{4-b}$ and $Y^2(R^8)_{6-b}$.

$Y^1$ is B or Al, preferably B, and $Y^2$ is P, Sb or As, preferably P.

In case X is $Y^1$ b is an integer from 1 to 4, i.e. b may be 1, 2, 3 or 4. Preferably b is >1.

In case X is $Y^2$ b is an integer from 1 to 6, i.e. b may be 1, 2, 3, 4, 5 or 6. Preferably b is 1.

X may be $Al(R^7)_{4-b}$, $B(R^7)_{4-b}$, $Sb(R^8)_{6-b}$, $As(R^8)_{6-b}$ or $P(R^8)_{6-b}$. Preferably X is $B(R^7)_{4-b}$ or $P(R^8)_{6-b}$.

$R^7$ and $R^8$ are independently at each occurrence selected from F, $R^9$ and $OR^9$, wherein one pair of $R^7$ or one or two pairs of $R^8$ may be combined and jointly be

forming a cycle with $Y^1$ or $Y^2$, respectively. "independently at each occurrence" means, that each $R^7$ of a $Y^1(R^7)_{4-b}$ group may be same or different from other $R^7$ present in the $Y^1(R^7)_{4-b}$ group and each $R^8$ of a $Y^2(R^8)_{6-b}$ group may be same or different from other $R^8$ being present in a $Y^2(R^8)_{6-b}$ group.

$R^9$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more F, preferably $R^9$ is selected from $C_1$-$C_6$ alkyl, which may be substituted by one or more F, more preferred $R^9$ is selected from $C_1$-$C_6$ alkyl, which is substituted by one or more F.

In case of $X = Y^1(R^7)_{4-b}$ none, one, two or three $R^7$ are present, which are selected independently from each other from F, $R^9$ and $OR^9$. Preferably $R^7$ is independently selected from F and $OR^9$, more preferred from F and $OR^9$ wherein $R^9$ is $C_1$-$C_6$ alkyl, which may be substituted by one or more F, even more preferred $R^7$ is selected from F and $OR^9$ wherein $R^9$ is $C_1$-$C_6$ alkyl, which is substituted by one or more F. In case two or three $R^7$ are present one pair of $R^7$ may be combined and jointly be

forming a cycle with $Y^1$. Preferably less than three $R^7$ are present.

In case of $X = Y^2(R^8)_{6-b}$ none, one, two, three, four or five $R^8$ are present, which are selected independently from each other from F, $R^9$ and $OR^9$. Preferably $R^8$ is independently selected from F and $R^9$, more preferred from F and $C_1$-$C_6$ alkyl, which may be substituted by one or more F, even more preferred $R^7$ is selected from F and $C_1$-$C_6$ alkyl, which is substituted by one or more F. In case at least two $R^8$ are present, one pair of $R^8$ may be combined and jointly be

forming a cycle with $Y^2$. In case at least four $R^8$ are present, two pairs of $R^8$ may be combined and jointly be

each forming a cycle with $Y^2$. Preferably five $R^8$ are present.

A pair of R denotes two R, e.g. a pair of $R^7$ means two of $R^7$ and two pairs of $R^8$ mean two times two $R^8$.

According to one embodiment $R^7$ and $R^8$ are independently at each occurrence selected from F, $OC_1$-$C_6$ alkyl, and $C_1$-$C_6$ alkyl which may be substituted by at least one F and wherein one pair of $R^7$ or one or two pairs of $R^8$ may be combined and jointly be

forming a cycle with $Y^1$ or $Y^2$, respectively, and/or one or more of $R^7$ or $R^8$ may be combined with $R^1$ and jointly forming a cycle with the POX-group, preferably $R^7$ and $R^8$ are independently at each occurrence selected from F, $OC_1$-$C_6$ alkyl, and $C_1$-$C_6$ alkyl substituted by at least one F and wherein one pair of $R^7$ or one or two pairs of $R^8$ may be combined and jointly be

forming a cycle with $Y^1$ or $Y^2$, respectively. More preferred $R^7$ and $R^8$ are F wherein one pair of $R^7$ or one or two pairs of $R^8$ may be combined and jointly be

forming a cycle with $Y^1$ or $Y^2$, respectively.

Preferred complex compounds of formula (I) are those having one of the following formulae (Ia) to (Ic) as defined below:

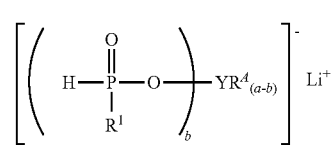
(Ia)

wherein
Y is Al, B, Sb, As or P, preferably B or P;
in case Y is Al or B a is 4 and b is an integer from 1 to 4;
in case Y is Sb, As or P a is 6 and b is an integer from 1 to 6;
each $R^A$ is independently selected from F, $OC_1$—$OC_6$ alkyl, and $C_1$-$C_6$ alkyl substituted by at least one F and two $R^A$ may be combined and jointly be

;

and
$R^1$ is $OSi(R^3R^4R^5)$;

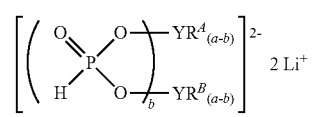
(Ib)

wherein

Y is Al, B, Sb, As or P, preferably B or P;

in case Y is Al or B a is 4 and b is an integer from 1 to 4;

in case Y is Sb, As or P a is 6 and b is an integer from 1 to 6;

each $R^A$ is independently selected from F, $OC_1$—$OC_6$ alkyl, and $C_1$-$C_6$ alkyl substituted by at least on F and two $R^A$ may be combined and jointly be

forming a cycle with Y, and each RB is independently selected from F, $OC_1$—$OC_6$ alkyl, and $C_1$-$C_6$ alkyl substituted by at least on F and two RB may be combined and jointly be

forming a cycle with Y.

Examples of complex compounds of formula (I) are

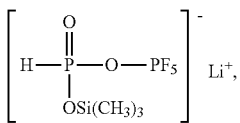
(1)

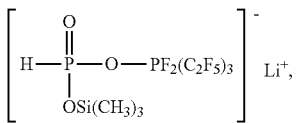
(2)

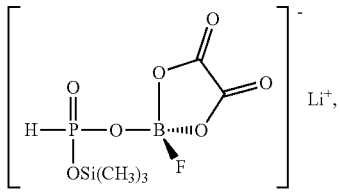
(3)

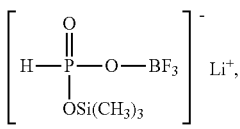
(4)

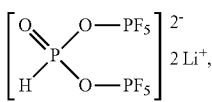
(5)

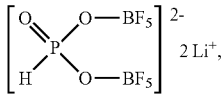
(6)

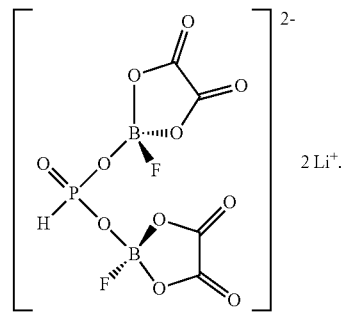
(7)

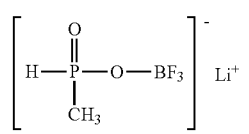
(8)

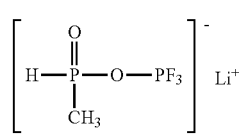
(9)

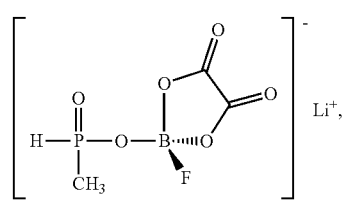
(10)

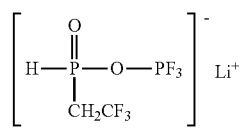
(11)

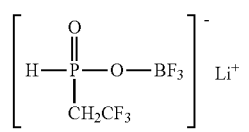
(12)

The compounds of formula (I) are producible by reaction of P-containing compounds of formula (II) with lithium complex salts of formula (III) within a non-aqueous solvent or solvent mixture. P-containing compounds of formula (II) are

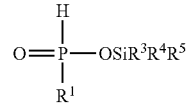
(II)

wherein $R^1$ is selected from H, F, $R^2$, $OR^2$, and $OSi(R^3R^4R^5)$;

$R^2$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F;

$R^3$, $R^4$, and $R^5$ are independently from each other selected from H, F, $R^2$, $OR^2$, and $OSi(R^6)_3$;

$R^6$ is independently at each occurrence selected from H, F, $R^2$ and $OR^2$.

Preferred compounds of formula (II) are PH(O)R¹OSi(C₁-C₆ alkyl)₃, more preferred PH(O)OSi(R³R⁴R⁵)OSi(C₁-C₆ alkyl)₃ e.g. PH(O)OSi(C₁-C₆ alkyl)₃OSi(C₁-C₆ alkyl)₃.

The lithium complex salts of formula (III) have the formula

wherein X is defined as above or as being preferred. It is possible to use one or more lithium complex salts of formula (III).

Examples of P-containing compounds of formula (II) are bis(trimethylsilyl)phosphite, methyl trimethylsilyl phosphite, and ethyl trimethylsilyl phosphite. The preparation of the P-containing compounds of formula (II) is known to the person skilled in the art. A description of a synthesis of bis(trimethylsilyl) phosphite may for example be found in M. Sekine et al., J. Org. Chem., Vol. 46 (1981), pages 2097 to 2107.

Examples of Li⁺[X—F]⁻ are $LiAlF_4$, $LiBF_4$, lithium difluoro oxalato borate, $LiPF_6$, $LiPF_3(C_2F_5)_3$, lithium difluoro (bisoxalato) phosphate, lithium tetrafluoro (oxalato) phosphate, $LiSbF_6$, and $LiAsF_6$.

Preferred complex compounds of formula (I) are producible by reaction of compounds of formula (II) with $LiBF_4$, lithium difluoro oxalato borate or $LiPF_6$.

The non-aqueous solvent or solvent mixture is preferably selected from the solvents described below as component (i) of the electrolyte composition and mixtures thereof.

The present invention also provides a process for preparing the compounds of formula (I) comprising the steps
(a) providing a non-aqueous solvent or solvent mixture, a P-containing compound of formula (II) as defined above, and a lithium complex salt of formula (III) as defined above;
(b) preparing a mixture of the non-aqueous solvent or solvent mixture, the P-containing compound of formula (II), and the lithium complex salt of formula (III);
(c) optionally isolating the compounds of formula (I) from the reaction mixture obtained in step (b).

For preparation of the complex compounds of formula (I) the P-containing compounds of formula (II) and the lithium complex salts of formula (III) are usually both added to a non-aqueous solvent or solvent mixture. It might be advantageous to prepare firstly a solution of Li⁺[X—F]⁻ in the non-aqueous solvent or solvent mixture and adding the P-containing compound of formula (II) to this solution. During the reaction the Si(R³R⁴R⁵) group of the compound of formula (II) and a fluorine atom stemming from the lithium complex salt react wherein FSi(R³R⁴R⁵) and a complex compound of formula (I) is formed. In case the P-containing compound of formula (II) contains a OSi(R³R⁴R⁵) group, this group may also react with a second fluorine atom of the same molecule or with a second molecule of the lithium complex salt of formula (III). In case the lithium complex salt of formula (III) contains more than one fluorine atom, it is also possible that the complex compound of formula (I) formed by reaction of one molecule of the P-containing compound of formula (II) and one molecule of lithium complex salt of formula (III) reacts with a second molecule of the P-containing compound of formula (II). Usually a mixture of different reaction products is formed during the reaction.

Another aspect of the present invention is the use of the compounds of formula (I) as additives in electrochemical cells, e.g. in lithium ion capacitors, double layer capacitors and lithium batteries, in particular in secondary lithium batteries as described below. Preferably the compounds of formula (I) are used in the electrolyte compositions for electrochemical cells. The compounds of formula (I) are capable of interacting with the cathode at the cathode-electrolyte interface and with the anode at the anode-electrolyte interface thereby reducing undesired reactions of the electrode active material with the electrolyte composition, e.g. inhibiting direct contact of components of the electrolyte composition with the cathode or anode active material by forming a film on the cathode or anode or by inhibiting the formation of electrolyte decomposition products detrimental for the cell operation (e.g. HF). The direct contact of electrolyte composition with the cathode or the anode often leads to decomposition reactions. The complex compounds of formula (I) can be used as cathode active additive and as anode active additive.

The complex compounds of formula (I) can also be used as additives for reducing gas generation in electrolyte compositions for electrochemical cells and for reducing the impedance built-up in the electrochemical cells, e.g. in lithium ion capacitors, double layer capacitors and lithium batteries, in particular in secondary lithium batteries as described below. Undesired generation of gas within an electrochemical cell is a safety issue since the increase of the internal pressure may lead to leakage of the cell and loss of electrolyte composition increasing the possibility of ignition and emission of unhealthy compounds. Increased impedance leads to undesired degradation of the rate capabilities of the cell.

The use of the complex compounds of formula (I) wherein the complex compound of formula (I) is generated in situ in the electrolyte composition of the electrochemical cell is in particular preferred. The complex compounds of formula (I) may be prepared in situ by adding one or more P-containing compounds of formula (II) and one or more lithium complex salts of formula (III) to the electrolyte composition of the electrochemical cells. The lithium complex salts of formula (III) are often used as conducting salts in the electrolyte composition, e.g. $LiAlF_4$, $LiBF_4$, lithium difluoro oxalato borate, $LiPF_6$, $LiPF_3(C_2F_5)_3$, lithium difluoro (bisoxalato) phosphate, $LiSbF_6$, and $LiAsF_6$. In case the lithium complex salts of formula (III) are used as conducting salt(s) of the electrolyte composition the complex compounds of formula (I) may be prepared in situ by just adding the P-containing compound of formula (II) to the electrolyte composition.

The complex compounds of formula (I) are usually used in the electrolyte compositions in the concentrations given below for the electrolyte compositions containing one or more complex compounds of formula (I) by adding the desired amounts of the complex compound(s) of formula (I) to the electrolyte composition or by preparing the desired amount in situ by adding sufficient amounts of P-containing compounds of formula (II) and lithium complex salts of formula (III). It is also possible to prepare a non-aqueous solution of the complex compounds of formula (I) by adding sufficient amounts of P-containing compounds of formula (II) and lithium complex salts of formula (III) to a solvent or solvent mixture and add the resulting reaction mixture to an electrolyte composition. It is possible to use one, two, three or more complex compounds of formula (I) in the electrolyte.

Another aspect of the invention are electrolyte compositions containing at least one complex compound of formula (I). The electrolyte compositions may contain one, two, three or more complex compounds of formula (I). In particular in case the complex compound of formula (I) is prepared in situ in the electrolyte composition several different complex compounds of formula (I) may be formed in the electrolyte composition. The electrolyte compositions may be prepared in situ e.g. by adding a P-containing compound of formula (II) to an electrolyte composition containing at least one non-aqueous solvent and a lithium complex salt of formula (III), optionally one or more additional lithium conducting salts and optionally one or more additives. The lithium complex salts of formula (III) may also function as lithium conducting salt. Therefore, another aspect of the present invention are electrolyte compositions obtainable by providing an electrolyte composition containing at least one non-aqueous solvent, at least one lithium conducting salt selected from lithium complex salts of formula (III), optionally one or more additives and optionally one or more lithium conducting salts different from lithium complex salts of formula (III) and adding at least one P-containing compound of formula (II). In case one or more additive and/or lithium conducting salts different from lithium complex salts of formula (III) are present in the electrolyte composition, the additives and/or lithium conducting salts may also be after the addition of the P-containing compound of formula (II) to the electrolyte composition. Viewed chemically, an electrolyte composition is any composition that comprises free ions and as a result is electrically conductive. The electrolyte composition functions as a medium that transfers ions participating in the electrochemical reactions taking place in an electrochemical cell. In case of a lithium battery the ion participating in the electrochemical reaction is usually the lithium ion. The most common electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in one or more aprotic organic solvents.

The electrolyte composition usually contains
(i) at least one aprotic organic solvent;
(ii) at least one lithium ion containing conducting salt;
(iii) at least one complex compound of formula (I); and
(iv) optionally one or more additives.

The electrolyte composition contains at least one aprotic organic solvent (i). The at least one aprotic organic solvent may be selected from optionally fluorinated aprotic organic solvents, i.e. from fluorinated and non-fluorinated aprotic organic solvents. The electrolyte composition may contain a mixture of fluorinated and non-fluorinated aprotic organic solvents.

The aprotic organic solvent is preferably selected from optionally fluorinated cyclic and acyclic organic carbonates, optionally fluorinated acyclic ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles and optionally fluorinated cyclic and acyclic phosphates and mixtures thereof.

Examples of optionally fluorinated cyclic carbonates are ethylene carbonate (EC), propylene carbonate (PC) and butylene carbonate (BC), wherein one or more H may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred optionally fluorinated cyclic carbonates are ethylene carbonate, monofluoroethylene carbonate, and propylene carbonate, in particular ethylene carbonate.

Examples of optionally fluorinated acyclic carbonates are di-$C_1$-$C_{10}$-alkylcarbonates, wherein each alkyl group is selected independently from each other and wherein one or more H may be substituted by F. Preferred are optionally fluorinated di-$C_1$-$C_4$-alkylcarbonates. Examples are e.g. diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of optionally fluorinated acyclic organic carbonates and cyclic organic carbonates at a ratio by weight of from 1:10 to 10:1, preferred of from 3:1 to 1:1.

Examples of optionally fluorinated acyclic ethers and polyethers are optionally fluorinated di-$C_1$-$C_{10}$-alkylethers, optionally fluorinated di-$C_1$-$C_4$-alkyl-$C_2$-$C_6$-alkylene ethers, optionally fluorinated polyethers, and fluorinated ethers of formula R'—(O—$CF_pH_{2-p}$)$_q$—R" wherein R' is a $C_1$-$C_{10}$ alkyl group or a $C_3$-$C_{10}$ cycloalkyl group, wherein one or more H of an alkyl and/or cycloalkyl group are substituted by F; R" is H, F, a $C_1$-$C_{10}$ alkyl group, or a $C_3$-$C_{10}$ cycloalkyl group, wherein one or more H of an alkyl and/or cycloalkyl group are substituted by F; p is 1 or 2; and q is 1, 2 or 3.

According to the invention each alkyl group of the optionally fluorinated di-$C_1$-$C_{10}$-alkylethers is selected independently from the other wherein one or more H of an alkyl group may be substituted by F. Examples of optionally fluorinated di-$C_1$-$C_{10}$-alkylethers are dimethylether, ethylmethylether, diethylether, methylpropylether, diisopropylether, di-n-butylether, 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of optionally fluorinated di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable optionally fluorinated polyethers are polyalkylene glycols wherein one or more H of an alkyl or alkylene group may be substituted by F, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethylend-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of fluorinated ethers of formula R'—(O—$CF_pH_{2-p}$)$_q$—R" are 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of optionally fluorinated cyclic ethers are 1,4-dioxane, tetrahydrofuran, and their derivatives like 2-methyl tetrahydrofuran wherein one or more H of an alkyl group may be substituted by F.

Examples of optionally fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of optionally fluorinated acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of optionally fluorinated acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone.

Examples of optionally fluorinated cyclic and acyclic sulfones are ethyl methyl sulfone, dimethyl sulfone, and tetrahydrothiophene-S,S-dioxide (sulfolane).

Examples of optionally fluorinated cyclic and acyclic nitriles and dinitriles are adipodinitrile, acetonitrile, propionitrile, and butyronitrile wherein one or more H may be substituted by F.

Examples of optionally fluorinated cyclic and acyclic phosphates are trialkyl phosphates wherein one or more H of an alkyl group may be substituted by F like trimethyl phosphate, triethyl phosphate, and tris(2,2,2-trifluoroethyl) phosphate.

More preferred the aprotic organic solvent(s) are selected from optionally fluorinated ethers and polyethers, optionally fluorinated cyclic and acyclic organic carbonates, optionally fluorinated cyclic and acyclic esters and diesters of carboxylic acids and mixtures thereof. Even more preferred the aprotic organic solvent(s) are selected from optionally fluorinated ethers and polyethers, and optionally fluorinated cyclic and acyclic organic carbonates, and mixtures thereof.

According to one embodiment the electrolyte composition contains at least solvent selected from fluorinated ethers and polyethers, e.g. compounds of formula fluorinated ethers of formula R'—(O—$CF_pH_{2-p}$)$_q$—R" as defined above like $CF_2HCF_2CH_2OCF_2CF_2H$ or $CF_2H(CF_2)_3CH_2OCF_2CF_2H$.

According to another embodiment, the electrolyte composition contains at least one solvent selected from fluorinated cyclic carbonate like 1-fluoro ethyl carbonate.

According to a further embodiment the electrolyte composition contains at least one solvent selected from fluorinated cyclic carbonate, e.g. 1-fluoro ethyl carbonate, and at least one solvent selected from fluorinated ethers and polyethers, e.g. compounds of formula fluorinated ethers of formula R'—(O—$CF_rH_{2-r}$)$_s$—R" as defined above like $CF_2HCF_2CH_2OCF_2CF_2H$ or $CF_2H(CF_2)_3CH_2OCF_2CF_2H$.

According to another embodiment the electrolyte composition contains at least one fluorinated cyclic carbonate, e.g. 1-fluoro ethyl carbonate and at least one non-fluorinated acyclic organic carbonate, e.g. dimethyl carbonate, diethyl carbonate or ethyl methyl carbonate.

The electrolyte composition contains at least one lithium ion containing conducting salt (ii). The electrolyte composition functions as a medium that transfers ions participating in the electrochemical reaction taking place in an electrochemical cell. The lithium ion containing conducting salt(s) (ii) present in the electrolyte composition are usually solvated in the aprotic organic solvent(s) (i). Examples of lithium ion containing conducting salts are Li[$F_{6-x}P(C_yF_{2y+1})_x$], wherein x is an integer in the range from 0 to 6 and y is an integer in the range from 1 to 20;

Li[B($R^I$)$_4$], Li[B($R^I$)$_2$(OR$^{II}$O)] and Li[B(OR$^{II}$O)$_2$] wherein each $R^I$ is independently from each other selected from F, Cl, Br, I, $C_1$-$C_4$ alkyl, $C_2$-$C_4$ alkenyl, $C_2$-$C_4$ alkynyl, O$C_1$-$C_4$ alkyl, O$C_2$-$C_4$ alkenyl, and O$C_2$-$C_4$ alkynyl wherein alkyl, alkenyl, and alkynyl may be substituted by one or more OR$^{III}$, wherein R$^{III}$ is selected from $C_1$-$C_6$ alkyl, $C_2$-$C_6$ alkenyl, and $C_2$-$C_6$ alkynyl, and (OR$_{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

LiCla$_4$; LiAsF$_6$; LiCF$_3$SO$_3$; Li$_2$SiF$_6$; LiSbF$_6$; LiAlCl$_4$, Li(N(SO$_2$F)$_2$), lithium tetrafluoro (oxalato) phosphate; lithium oxalate; and salts of the general formula Li[$Z(C_nF_{2+1}SO_2)_m$], where m and n are defined as follows:

m=1 when Z is selected from oxygen and sulfur, m=2 when Z is selected from nitrogen and phosphorus, m=3 when Z is selected from carbon and silicon, and n is an integer in the range from 1 to 20.

Suited 1,2- and 1,3-diols from which the bivalent group (OR$^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group (OR$^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (OR$^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B($R^I$)$_4$], Li[B($R^I$)$_2$(OR$^{II}$O)] and Li[B(OR$^{II}$O)$_2$] are LiBF$_4$, lithium difluoro oxalato borate and lithium dioxalato borate.

Preferably the at least one lithium ion containing conducting salt is selected from LiPF$_6$, LiAsF$_6$, LiSbF$_6$, LiCF$_3$SO$_3$, LiBF$_4$, lithium bis(oxalato) borate, LiClO$_4$, LiN(SO$_2$C$_2$F$_5$)$_2$, LiN(SO$_2$CF$_3$)$_2$, LiN(SO$_2$F)$_2$, and LiPF$_3$ ($CF_2CF_3)_3$, more preferred the conducting salt is selected from $LiPF_6$, $LiN(SO_2F)_2$, and $LiBF_4$, and the most preferred conducting salt is $LiPF_6$.

The lithium conducting salt(s) are usually present at a minimum concentration of at least 0.1 mol/l, preferably the concentration of the ion containing conducting salt(s) is 0.5 to 2 mol/l based on the entire electrolyte composition.

Usually the electrolyte composition contains in total at least 0.001 wt.-% of the at least one compound of formula (I), based on the total weight of electrolyte composition, preferably at least 0.01 wt.-%, and more preferred at least 0.1 wt.-%, based on the total weight of electrolyte composition. The maximum value of the total concentration of compounds of formula (I) in the electrolyte composition is usually 10 wt.-%, based on the total weight of electrolyte composition, preferably 5 wt.-%, more preferred the upper limit of the total concentration of compounds of formula (I) is 3 wt.-%, and even more preferred 2 wt.-%, based on the total weight of electrolyte composition. Usually the electrolyte composition contains in total 0.001 to 10 wt.-%, of the at least one compound of formula (I), based on the total weight of electrolyte composition, preferably 0.01 to 5 wt.-%, more preferably 0.1 to 5 wt.-% and most preferred 0.1 to 3 wt.-%.

Furthermore, the electrolyte composition may contain at least one further additive different from the complex compounds of formula (I). The at least one further additive different from the complex compounds of formula (I) may be selected from polymers, film forming additives, flame retardants, overcharging additives, wetting agents, HF and/or $H_2O$ scavenger, stabilizer for $LiPF_6$ salt, ionic solvation enhancer, corrosion inhibitors, and gelling agents.

The minimum concentration of the at least one further additive is usually 0.005 wt.-%, preferably the minimum concentration is 0.01 wt.-% and more preferred the minimum concentration is 0.1 wt.-%, based on the total weight of electrolyte composition. The maximum concentration of the at least further additive is usually 25 wt.-%.

One class of further additives are polymers. Polymers may be selected from polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. Polymers may be added to a formulation according to the present invention in order to convert liquid formulations into quasi-solid or solid electrolytes and thus to improve solvent retention, especially during ageing. In this case they function as gelling agents.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or $H_2O$ scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Another class of additives are film forming additives, also called SEI-forming additives. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a metal counter electrode, and an electrolyte containing a small amount of said compound, typically from 0.1 to 10 wt.-% of the electrolyte composition, preferably from 0.2 to 5 wt.-% of the electrolyte composition. Upon application of a voltage between anode and lithium metal, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. More preferred the electrolyte composition contains at least one SEI forming selected from vinylene carbonate and its derivatives such as vinylene carbonate and methylvinylene carbonate; fluorinated ethylene carbonate and its derivatives such as monofluoroethylene carbonate, cis- and trans-difluorocarbonate; organic sultones such as propylene sultone, propane sultone and their derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and sulfur containing additives as described in detail in WO 2013/026854 A1, in particular the sulfur containing additives shown on page 12 line 22 to page 15, line 10.

A compound added may have more than one effect in the electrolyte composition and the electrochemical cell comprising the electrolyte composition. E.g. lithium oxalato borate may be added as additive enhancing the SEI formation but can also function as conducting salt.

The electrolyte composition is preferably non-aqueous. In one embodiment of the present invention, the water content of the electrolyte composition is preferably below 100 ppm, based on the weight of the respective inventive formulation, more preferred below 50 ppm, most preferred below 30 ppm. The water content may be determined by titration according to Karl Fischer, e.g. described in detail in DIN 51777 or ISO760: 1978. The minimum water content of electrolyte compositions may be selected from 3 ppm, preferably 5 ppm.

In one embodiment of the present invention, the HF-content of the electrolyte composition is preferably below 100 ppm, based on the weight of the respective inventive formulation, more preferred below 50 ppm, most preferred below 30 ppm. The HF content may be determined by titration.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte composition may be prepared by methods which are known to the person skilled in the field of the production of electrolytes, generally by dissolving the lithium conductive salt(s) (ii) in the corresponding solvent or solvent mixture (i) and adding the at least one complex compound of formula (I) or a solvent mixture containing the reaction products of the preparation of the complex compounds of formula (I) (and optionally further additive(s) (iv), or by preparing the complex compound of formula (I) in situ in the electrolyte composition as described above, e.g. adding a P-containing compound of formula (II) to the solvent or solvent mixture(i) containing a lithium complex salt of formula (III) as conducting salt (i).

Another aspect of the invention are electrochemical cells comprising the electrolyte as described above or as described as preferred.

The electrochemical cell usually comprises (A) an anode comprising at least one anode active material, (B) a cathode comprising at least one cathode active material; and (C) the electrolyte composition as described above.

The electrochemical cell may be a lithium battery, a double layer capacitor, or a lithium ion capacitor. The general construction of such electrochemical devices is known and is familiar to the person skilled in this art—for batteries, for example, in Linden's Handbook of Batteries (ISBN 978-0-07-162421-3).

Preferably the inventive electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds. The lithium battery is preferably a secondary lithium battery, i.e. a rechargeable lithium battery.

In particular preferred embodiments the electrochemical cell is a lithium ion battery, i.e. a secondary lithium ion electrochemical cell comprising a cathode (A) comprising a cathode active material that can reversibly occlude and release lithium ions and an anode (B) comprising an anode active material that can reversibly occlude and release lithium ions.

Anode (A) comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite materials, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon; and carbonic anode active material (thermally decomposed carbon, coke, graphite) such as a carbon composite, combusted organic polymer, and carbon fiber. A preferred carbonaceous material is graphite.

Further examples of anode active materials are lithium metal and lithium metal alloys, i.e. materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Further possible anode active materials are silicon containing materials. Silicon containing materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material comprises carbonaceous material that can reversibly occlude and release lithium ions, particularly preferred the carbonaceous material that can reversibly occlude and release lithium ions is selected from crystalline carbon, hard carbon and amorphous carbon, and particularly preferred is graphite. It is also preferred that the anode active material comprises silicon containing materials. It is further preferred that the anode active material comprises lithium ion intercalating oxides of Ti.

The inventive electrochemical cell comprises a cathode (B) comprising at least one cathode active material. The at least one cathode active material comprises a material capable of occluding and releasing lithium ions and may be selected from lithium transition metal oxides and lithium transition metal phosphates of olivine structure.

Examples of lithium transition metal phosphates of olivine structure are $LiFePO_4$; $LiNiPO_4$; $LiMnPO_4$; and $LiCoPO_4$.

Examples of mixed lithium transition metal oxides are $LiCoO_2$, $LiNiO_2$, $LiMnO_2$, mixed lithium transition metal oxides with layer structure, manganese containing spinels, and lithium intercalating mixed oxides of Ni, Al and at least one second transition metal.

Preferably the at least one cathode active material is selected from mixed lithium transition metal oxides containing Mn and at least one second transition metal; lithium intercalating mixed oxides containing Ni, Al and at least one second transition metal; $LiMnPO_4$; $LiNiPO_4$; and $LiCoPO_4$.

Examples of mixed lithium transition metal oxides containing Mn and at least one second transition metal are lithium transition metal oxides with layered structure of formula (II)

$$Li_{1+e}(Ni_aCo_bMn_cM_d)_{1-e}O_2 \qquad (II)$$

wherein
a is in the range of from 0.05 to 0.9, preferred in the range of 0.1 to 0.8,
b is in the range of from zero to 0.35,
c is in the range of from 0.1 to 0.9, preferred in the range of 0.2 to 0.8,
d is in the range of from zero to 0.2,
e is in the range of from zero to 0.3, preferred in the range of >zero to 0.3, more preferred in the range of 0.05 to 0.3, with a +b+c+d=1, and
M being one or more metals selected from Na, K, Al, Mg, Ca, Cr, V, Mo, Ti, Fe, W, Nb, Zr, and Zn.

Cobalt containing compounds of formula (II) are also named NCM.

Lithium transition metal oxides with layered structure of formula (II) wherein e is larger than zero are also called overlithiated.

Preferred lithium transition metal oxides with layered structure of formula (II) are compounds forming a solid solution wherein a $LiM'O_2$ phase in which M' is Ni, and optionally one or more transition metals selected from Co and Mn and a $Li_2MnO_3$ phase are mixed and wherein one or more metal M as defined above may be present. The one or more metals M are also called "dopants" or "doping metal" since they are usually present at minor amounts, e.g. at maximum 10 mol-% M or at maximum 5 mol-% M or at maximum 1 mol.-% based on the total amount of metal except lithium present in the transition metal oxide. In case one or more metals M are present, they are usually present in an amount of at least 0.01 mol-% or at least 0.1 mol-% based on the total amount of metal except lithium present in the transition metal oxide. These compounds are also expressed by formula (IIa)

$$z\ LiM'O_2.(1-z)Li_2MnO_3 \qquad (IIa)$$

wherein M' is Ni and at least one metal selected from Mn and Co;
z is 0.1 to 0.8,
and wherein one or more metals selected from Na, K, Al, Mg, Ca, Cr, V, Mo, Ti, Fe, W, Nb, Zr, and Zn may be present.

Electrochemically, the Ni and if present Co atoms in the $LiM'O_2$ phase participate in reversible oxidation and reduction reactions leading to Li-ions deintercalation and intercalation, respectively, at voltages below 4.5 V vs. $Li^+/Li$, while the $Li_2MnO_3$ phase participates only in oxidation and reduction reactions at voltages equal or above 4.5 V vs. $Li^+/Li$ given that Mn in the $Li_2MnO_3$ phase is in its +4 oxidation state. Therefore, electrons are not removed from the Mn atoms in this phase but from the 2p orbitals of oxygen ions, leading to the removal of oxygen for the lattice in the form of $O_2$ gas at least in the first charging cycling.

These compounds are also called HE-NCM due to their higher energy densities in comparison to usual NCMs. Both HE-NCM and NCM have working voltages of about 3.0 to 3.8 V against $Li/Li^+$, but high cut off voltages have to be used both for activating and cycling of HE-NCMs to actually accomplish full charging and to benefit from their higher energy densities. Usually the upper cut-off voltage for the cathode during charging against $Li/Li^+$ is of at least 4.5 V for activating the HE-NCM, preferably of at least 4.6 V, more preferred of at least 4.7 V and even more preferred of at least 4.8 V. The term "upper cut-off voltage against $Li/Li^+$ during charging" of the electrochemical cell means the voltage of the cathode of the electrochemical cell against a $Li/Li^+$ reference anode which constitute the upper limit of the voltage at which the electrochemical cell is charged. Examples of HE-NCMs are $0.33Li_2MnO_3.0.67Li(Ni_{0.4}Co_{0.2}Mn_{0.4})O_2$, $0.42Li_2MnO_3.0.58Li(Ni_{0.4}Co_{0.2}Mn_{0.4})O_2$, $0.50Li_2MnO_3.0.50Li(Ni_{0.4}Co_{0.2}Mn_{0.4})O_2$, $0.40Li_2MnO_3.0.60Li(Ni_{0.8}Co_{0.1}Mn_{0.1})O_2$, and $0.42Li_2MnO_3.0.58Li(Ni_{0.6}Mn_{0.4})O_2$.

Examples of manganese-containing transition metal oxides with layer structure of formula (II) wherein d is zero are $LiNi_{0.33}Mn_{0.67}O_2$, $LiNi_{0.25}Mn_{0.75}O_2$, $LiNi_{0.35}Co_{0.15}Mn_{0.5}O_2$, $LiNi_{0.21}Co_{0.08}Mn_{0.71}O_2$, $LiNi_{0.22}Co_{0.12}Mn_{0.66}O_2$, $LiNi_{0.8}Co_{0.1}Mn_{0.1}O_2$, $LiNi_{0.6}Co_{0.2}Mn_{0.2}O_2$, and $LiNi_{0.5}Co_{0.2}Mn_{0.3}O_2$. It is preferred that the transition metal oxides of general formula (II) wherein d is zero do not contain further cations or anions in significant amounts.

Examples of manganese-containing transition metal oxides with layer structure of formula (II) wherein d is larger than zero are $0.33Li_2MnO_3.0.67Li(Ni_{0.4}Co_{0.2}Mn_{0.4})O_2$, $0.42Li_2MnO_3.0.58Li(Ni_{0.4}Co_{0.2}Mn_{0.4})O_2$, $0.50Li_2MnO_3.0.50Li(Ni_{0.4}Co_{0.2}Mn_{0.4})O_2$, $0.40Li_2MnO_3.0.60Li(Ni_{0.8}Co_{0.1}Mn_{0.1})O_2$, and $0.42Li_2MnO_3.0.58Li(Ni_{0.6}Mn_{0.4})O_2$ wherein one or more metal M selected from Na, K, Al, Mg, Ca, Cr, V, Mo, Ti, Fe, W, Nb, Zr, and Zn may be present. The one or more doping metal is preferably present up to 1 mol-%, based on the total amount of metal except lithium present in the transition metal oxide.

Other preferred compounds of formula (II) are Ni-rich compounds, wherein the content of Ni is at least 50 mol. % based on the total amount of transition metal present. This includes compounds of formula (IIb)

$$Li_{1+e}(Ni_aCo_bMn_cM_d)_{1-e}O_2 \qquad (IIb)$$

wherein
a is in the range of from 0.5 to 0.9, preferred in the range of 0.5 to 0.8,
b is in the range of from zero to 0.35,
c is in the range of from 0.1 to 0.5, preferred in the range of 0.2 to 0.5,
d is in the range of from zero to 0.2,
e is in the range of from zero to 0.3,
with a +b+c+d=1, and
M being one or more metals selected from Na, K, Al, Mg, Ca, Cr, V, Mo, Ti, Fe, W, Nb, Zr, and
Zn.

Examples of Ni-rich compounds of formula (I) are $Li[Ni_{0.8}Co_{0.1}Mn_{0.1}]O_2$ (NCM 811), $Li[Ni_{0.6}Co_{0.2}Mn_{0.2}]O_2$ (NCM 622), and $Li[Ni_{0.5}Co_{0.2}Mn_{0.3}]O_2$ (NCM 523).

Further examples of mixed lithium transition metal oxides containing Mn and at least one second transition metal are manganese-containing spinels of formula (III)

$$Li_{1+t}M_{2-t}O_{4-s} \qquad (III)$$

wherein s is 0 to 0.4, t is 0 to 0.4, and

M is Mn and at least one further metal selected from Co and Ni, preferably M is Mn and Ni and optionally Co, i.e. a part of M is Mn and another part of Ni, and optionally a further part of M is selected from Co.

The cathode active material may also be selected from lithium intercalating mixed oxides containing Ni, Al and at least one second transition metal, e.g. from lithium intercalating mixed oxides of Ni, Co and Al. Examples of mixed oxides of Ni, Co and Al are compounds of formula (IV)

$$Li[Ni_hCo_jAl_j]O_2 \quad (IV)$$

wherein h is 0.7 to 0.9, preferred 0.8 to 0.87, and more preferred 0.8 to 0.85;

i is 0.15 to 0.20; and j is 0.02 to 10, preferred 0.02 to 1, more preferred 0.02 to 0.1, and most preferred 0.02 to 0.03.

The cathode active material may also be selected from LiMnPO$_4$, LiNiPO$_4$ and LiCoPO$_4$. These phosphates show usually olivine structure and usually upper cut-off voltages of at least 4.5 V have to be used for charging.

Cathode (B) may contain further components like binders and electrically conductive materials such as electrically conductive carbon. For example, cathode (B) may comprise carbon in a conductive polymorph, for example selected from graphite, carbon black, carbon nanotubes, graphene or mixtures of at least two of the aforementioned substances. Examples of binders used in cathode (B) are organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth) acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Anode (A) and cathode (B) may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin or Nafion separators.

Several inventive electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive electrochemical cells can also be used for stationary energy stores.

The present invention is further illustrated by the following examples that do not, however, restrict the invention.

EXPERIMENTAL SECTION

A) Electrolyte Compositions

A.1) Electrolyte Compositions for Electrochemical Investigations

The electrolyte compositions were prepared by dissolving different amounts of LiPF$_6$, LiBF$_4$, lithium difluoro (oxalato) borate (LiDFOB) or lithium bis(fluorosulfonyl) imide (LiFSI) in different mixtures of ethyl carbonate (EC, BASF), diethyl carbonate (DEC, BASF), monofluoroethylene carbonate (FEC, BASF), 1H,1H,5H-perfluoropentyl-1,1,2,2-tetrafluoroethylether (CF$_2$H(CF$_2$)$_3$CH$_2$OCF$_2$CF$_2$H, FPEE, Foosung co., Ltd). Different comparative and inventive additives were added to these compositions as indicated in Tables 1 and 2. "vol. %" refers to the volume of the solvents in the electrolyte composition. The additive concentrations are expressed either in "wt. %", which refers to the total weight of the electrolyte composition, or in mol/L, which corresponds to the molar concentration of the additive. The concentrations of the lithium salts are given in mol/L, also abbreviated as "M". The additives were commercially available with the exception of compound A2 and A3. A2 was prepared according to R. Rabinowitz, J. Org. Chem., Vol. 28 (1963), pages 2975 to 2978. A3 was prepared according to M. Sekine et al., J. Org. Chem., Vol. 46 (1981), pages 2097 to 2107. All solvents were dry (water content <3 ppm). All electrolyte compositions were prepared and stored in an Ar-filled glovebox having oxygen and water levels below 1.0 ppm.

TABLE 1

Electrolyte additives employed

 VC

 PS

TABLE 1-continued

Electrolyte additives employed

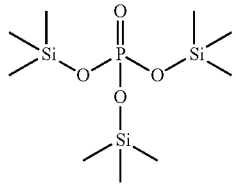
A1

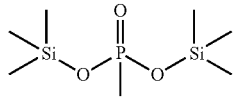
A2

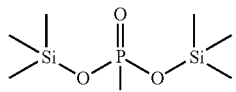
A3

TABLE 2

Electrolyte formulations employed

| Electrolyte composition | Conducting Salt [M] | | | | Solvents [vol. %] | | | | Additives [wt. %] | | | | | | [mol/L] |
|---|---|---|---|---|---|---|---|---|---|---|---|---|---|---|---|
| | LiPF$_6$ | LiBF$_4$ | LiDFOB | LiFSI | EC | FEC | DEC | FPEE | VC | PS | FEC | A1 | A2 | A3 | A3 |
| EL 1 (comparative) | 1 | | | | 12 | | 64 | 24 | | | | | | | |
| EL 2 (comparative) | 1 | | | | 12 | | 64 | 24 | | | | 2 | | | |
| EL 3 (comparative) | 1 | | | | 12 | | 64 | 24 | | | | | 2 | | |
| EL 4 (inventive) | 1 | | | | 12 | | 64 | 24 | | | | | | 2 | |
| EL 5 (comparative) | 1 | | | | | 30 | 70 | | 1 | | 1.5 | | | | |
| EL 6 (comparative) | 1 | | | | | 30 | 70 | | 1 | 1 | 1.5 | | | | |
| EL 7 (inventive) | 1 | | | | | 30 | 70 | | 1 | | 1.5 | | | 1 | |
| EL 8 (inventive) | 1 | | | | 12 | | 64 | 24 | | | | | | 4 | |
| EL 9 (comparative) | | 1 | | | | 30 | 70 | | | | | | | | |
| EL 10 (inventive) | | 1 | | | | 30 | 70 | | | | | | | 4 | |
| EL 11 (inventive) | | 0.1 | | | | 30 | 70 | | | | | | | | 0.1 |
| EL 12 (inventive) | | 0.05 | | | | 30 | 70 | | | | | | | | 0.1 |
| EL 13 (inventive) | | | 0.1 | | | 30 | 70 | | | | | | | | 0.1 |
| EL 14 (comparative) | | | | 0.1 | | 30 | 70 | | | | | | | | 0.1 |

B) Electrochemical Cells

C.1) HE-NCM/Graphite 2032 Full Coin Cells

The positive electrodes for the electrochemical cycling experiments were prepared by coating a slurry containing 92.5 wt. % of cathode active material, 2 wt. % Graphite, 2 wt. % Super C65 carbon black and 3.5 wt. % PVDF binder suspended in N-ethyl-2-pyrrolidinone (NEP) on aluminum foil. The cathode active material was the HE-NCM 0.33Li$_2$MnO$_3$. 0.67Li(Ni$_{0.4}$Mn$_{0.4}$Co$_{0.2}$)O$_2$, HE-NCM, BASF). Commercial graphite-coated tapes from Elexcel Corporation Ltd. were used as negative electrodes. The positive, negative composite electrodes, a polypropylene separator (Celgard) and the respective electrolyte were used to manufacture 2032 coin cells. All cells were assembled in an argon-filled glove box having oxygen and water levels below 1.0 ppm and their electrochemical testing carried out in a Maccor 4000 battery-test system.

B.2) NCM424/Graphite and NCM622/Graphite Pouch Cells

The positive electrodes for the electrochemical cycling experiments in pouch cells were prepared by coating on aluminum foil (thickness=17 μm) using a roll coater a slurry containing cathode active material, carbon black and polyvinylidene fluoride (PVdF) binders suspended in N-methyl-2-pyrrolidinone (NMP). The electrode tapes were dried in a hot air chamber and dried further under vacuum at 130° C. for 8 h and the electrodes were pressed using a roll pressor. The cathode active materials employed were either Li(Ni$_{0.4}$Co$_{0.2}$Mn$_{0.4}$)O$_2$ (NCM424) or Li(Ni$_{0.6}$ Co$_{0.2}$Mn$_{0.2}$)O$_2$ (NCM622). For the negative electrodes, an aqueous slurry aqueous was prepared by mixing graphite and carbon black with CMC (carboxymethyl cellulose) and SBR (styrene butadiene rubber). The obtained slurry was coated onto copper foil (thickness=9 μm) by using a roll coater and dried under hot air chamber (80° C. to 120° C.). The loading of the resulted electrode was found to be 10 mg/cm$^2$. The electrodes was pressed by roll pressor to an approximate thickness of 72 μm. Pouch cells (250 mAh) were assembled in Ar-filled glove box, comprising NCM positive electrodes and graphite negative electrodes with a separator superposed between cathode and anode. Thereafter, all cells were filled with electrolyte, as described in Tables 3, 4, 5 and 6, in an Argon-Filled Glove Box Having Oxygen and Water Levels below 1.0 ppm and their electrochemical testing carried out in a Maccor 4000 battery-test system.

C) Evaluation of Cycling and Cell Resistance in HE-NCM/Graphite 2032 Coin Full Cells at 25° C.

The cells were charged at a constant current of 0.067 C to a voltage of 4.7 V and discharged with a constant current of 0.067 C to a discharge voltage of 2.0 V (First activation cycle) at 25° C. The first cycle coulombic efficiency is defined as the ratio between the measured discharge and charge capacities.

Immediately after the cells are charged at 25° C. at a constant current of 0.1 C to a voltage of 4.6 V. The cells were further charged at 4.6 V until the current reached a value of 0.05 C and then discharged at a constant current of 0.1 C to a discharge voltage of 2.0 V (second cycle). The same procedure as in the second cycle was repeated 3 times (cycles 3 to 5). In the cycles 6 to 7, the cells are charged at 25° C. at a constant current of 0.2 C to a voltage of 4.6 V. The cells were further charged at 4.6 V until the current reached a value of 0.05 C and then discharged at a constant current of 0.5 C to a discharge voltage of 2.0 V. Then, the cells are charged at a constant current of 0.7 C to a voltage of 4.6 V, charged at 4.6 V until the current reached a value of 0.05 C and while keeping constant this charging conditions then the cells are discharged to a discharge voltage of 2.0 V at a constant current of 1 C (2 times, cycles 8 to 9), 2 C (2 times, cycles 10 to 11) and 3 C (2 times, cycles 12 to 13).

Following the variation of discharge rates, prolonged cycling was carried out by charging the cells at a constant current of 0.7 C to a voltage of 4.6 V, charging at 4.6 V until the current reached a value of 0.05 C and discharging to a discharge voltage of 2.0 V at a constant current of 1 C (Cycle 14). The discharge capacity measured for cycle 14 was recorded as the first discharge capacity at 1 C. This charge and discharge procedure was repeated at least 400 times or until the measured charge capacity is lower than 50% of the charge capacity of cycle 14. During the prolonged cycling experiments, DC internal resistance (DCIR) measurements were carried out at each cycle immediately after fully charging the cells (100% state-of-charge) by applying a 0.2 C current interrupt during 10 seconds. The results from the various examples are presented in Table 3.

by degassing and initial volume measurements carried out via Archimedes measurements in water at ambient temperature.

D.2) Cycle Stability of Pouch Full-Cell Comprising NCM424//Graphite at 45° C.

After completing the formation procedure, the initial charge (CCCV charge, 0.2 C, 4.5V, 0.05 C cut-off) and discharge (CC discharge, 0.2 C, 3.0 V cut-off) capacities were measured. The cell resistance after formation was determined by charging the cells up to 50% SOC and carrying out DC internal resistance (DCIR) measurements by applying a current interrupt and the cells were discharged (CC discharge, 0.2 C, 3.0V cut-off). Then the cells were charged at a constant current of 0.6 C to a voltage of 4.5 V, charged at 4.5 V until the current reached a value of 0.05 C and discharged to a voltage of 3.0 V at a constant current of 1 C and the discharge capacity measured was set as the reference discharge capacity value and corresponding to 100%. This charge and discharge procedure was repeated

TABLE 3

Results obtained from HE-NCM/Graphite cells cycling experiments at 25° C.

| | Electrolyte | First Cycle Coulombic Efficiency [%] | Capacity retention after 200 1 C-cycles [%] | Capacity Retention after 400 1 C-cycles [%] | Cell Resistance after 200 1 C-cycles [Ohm cm$^2$] |
|---|---|---|---|---|---|
| Comparative Example 1 | EL 1 | 87.8 | 80.5 | — | 329 |
| Comparative Example 2 | EL 2 | 87.2 | 87.2 | 81.1 | 242 |
| Comparative Example 3 | EL 3 | 86.5 | 86.7 | 77.0 | 280 |
| Inventive Example 1 | EL 4 | 88.1 | 95.6 | 90.5 | 163 |

D) Evaluation of Cycling of Pouch Cell Comprising NCM424/Graphite Anode

D.1) Formation

Pouch full-cells prepared comprising a NCM424 cathode and graphite anode were charged at a constant current of 0.1 C either to a voltage of 3.7 V or during maximum 2 hours. Then, the cells were stored for 17 hours at 45° C. followed 200 times. The discharge capacities in cycle 100 and 200 are reported in Table 4 and are expressed as a percentage of the reference discharge capacity. Then, the cells were charged up to 50% SOC to determine their resistance after cycling via DC internal resistance (DCIR) measurements by applying a current interrupt, discharged at a constant current of 0.2 C to a voltage of 3.0 V. Finally, volume measurements after cycling were carried out via Archimedes measurements in water at ambient temperature. The results from the various examples are presented in Table 4.

TABLE 4

Results obtained from NCM-424/Graphite cells cycling experiments at 45° C.

| | Electrolyte | Capacity retention after 100 cycles [%] | Capacity Retention after 200 Cycles [%] | Cell resistance after formation [Ohm cm$^2$] | Cell resistance after 200 cycles at 45° C. [Ohm cm$^2$] | Cell volume change after 200 cycles at 45° C. [mL] |
|---|---|---|---|---|---|---|
| Comparative Example 4 | EL 1 | 93.0 | 64.2 | 107.4 | 147.0 | 0.36 |
| Comparative Example 5 | EL 3 | 93.5 | 87.2 | 68.7 | 92.0 | 0.33 |
| Inventive Example 6 | EL 4 | 93.7 | 89.8 | 82.7 | 95.7 | 0.10 |

E) Evaluation of Cycling and High-Temperature Storability of Pouch Cell Comprising NCM622/Graphite Anode

E.1) Formation

Pouch full-cells prepared comprising a NCM622 cathode and graphite anode were charged up to 10% SOC at ambient temperature. Degassing process was applied to the cells before charge (CCCV charge, 0.2 C, 4.2 V cut off 0.015 C) and discharge (CC discharge, 0.2 C, 2.5 V cut-off) at ambient temperature. Then, the cells were charged again up to 4.2V (CCCV charge, 0.2 C, 4.2 V cut off 0.015 C) and stored at 60° C. for 6 h. After formation, the initial charge (CCCV charge, 0.2 C, 4.2 V, 0.015 C cut-off) and discharge (CC discharge, 0.2 C, 2.5 V cut-off) capacities were measured. The cell resistance after formation was determined by charging the cells up to 50% SOC and DC internal resistance (DCIR) measurements by applying a current interrupt. The results from the various examples are presented in Table 5.

E.2) Cycle Stability of Pouch Full-Cell Comprising NCM622//Graphite at 45° C.

After completing the formation procedure, the cells were charged in CC/CV mode up to 4.2V with 1 C current and cut-off current of 0.015 C and discharged down to 2.5 V with 1 C at 45° C. This charge/discharge (one cycle) procedure was repeated 250 times. The final charge (CCCV charge, 0.2 C, 4.2 V, 0.015 C cut-off) and discharge (CC discharge, 0.2 C, 2.5 V cut-off) capacities were measured after cycling. The capacity retention after cycling is expressed as the ratio between the final and initial discharge capacity. The cell resistance after cycling was determined by charging the cells up to 50% SOC and DC internal resistance (DCIR) measurements by applying a current interrupt. The results from the various examples are presented in Table 5.

TABLE 5

Results obtained from NCM-622/Graphite cells cycling experiments at 45° C.

| | Electrolyte | Cell Resistance after formation [Ohm cm$^2$] | Cell Resistance after cycling at 45° C. [Ohm cm$^2$] | Capacity retention at 0.2 C after cycling at 45° C. [%] |
|---|---|---|---|---|
| Comparative Example 6 | EL 5 | 86.9 | 285.8 | 75.0 |
| Comparative Example 7 | EL 6 | 81.3 | 182.4 | 85.9 |
| Inventive Example 3 | EL 7 | 75.6 | 126.0 | 86.4 |

E.3) High Temperature Storage of Pouch Full-Cell Comprising NCM622//Graphite at 60° C.

After completing the formation procedure, the cells were charged up to 4.2 V at ambient temperature and then stored at 60° C. for 30 days. The generated gas amount (mL) during the storage was determined by Archimedes measurements in water at ambient temperature and the results are summarized in Table 6. The final charge (CCCV charge, 0.2 C, 4.2 V, 0.015 C cutoff) and discharge (CC discharge, 0.2 C, 2.5 V cut-off) capacities were measured after storage tests. The capacity retention after cycling is expressed as the ratio between the final and initial discharge capacity. The cell resistance after cycling was determined by charging the cells up to 50% SOC and DC internal resistance (DCIR) measurements by applying a current interrupt. The results from the various examples are presented in Table 6.

TABLE 6

Results obtained from NCM-622/Graphite cells storage experiments at 60° C.

| | Electrolyte | Cell Resistance after 30 days storage at 60° C. [Ohm cm$^2$] | Cell volume change after 8 days storage at 60° C. [mL] | Cell volume change after 15 days storage at 60° C. [mL] | Cell volume change after 30 days storage at 60° C. [mL] |
|---|---|---|---|---|---|
| Comparative Example 8 | EL 5 | 101.5 | 1.90 | 1.82 | 1.75 |
| Comparative Example 9 | EL 6 | 107.2 | 0.49 | 0.49 | 0.61 |
| Inventive Example 4 | EL 7 | 90.2 | 0.27 | 0.30 | 0.43 |

F) NMR Analysis

EL 8 was analyzed by $^1$H NMR spectroscopy and $^{19}$F NMR spectroscopy directly after preparation and after one week of storage at 25° C. The electrolytes were analyzed using $^1$H, $^{19}$F and $^{31}$P NMR without any dilution. The spectra were recorded on a Bruker Avance III equipped with a CryoProbe Prodigy probe head or on a Varian NMR system 400 operating at a frequency of $^1$H: 500.36 MHz, $^{19}$F: 470.76 MHz, $^{31}$P: 202.56 MHz. Bruker TopSpin software was used to analyze the spectra. All signals were referenced in $^1$H NMR to d$_6$-benzene (7.16 ppm) or d$_6$-DMSO (2.50 ppm); placed in an internal capillary), in $^{31}$P NMR to LiPF$_6$ (−145.88 ppm, septet, E. J. Cairns et al., J. Electrochem. Soc. Vol. 152 (2005), pages A1629 to A1632) within the electrolyte and in $^{19}$F NMR to LiPF$_6$ (−73.18 ppm, d, reference same as for $^{31}$P NMR). $^{31}$P NMR data were collected for the sake of clarity decoupled from proton: {1H}: Quantitative analysis was performed in $^{19}$F NMR using 3,5-bis(trifluoromethyl)benzoic acid as an internal standard.

In FIG. 1 parts of the 1H NMR spectrum and in FIG. 2 part of the 19F NMR spectrum of EL 8 directly after formation are shown. The spectra indicate the presence of additive A3 (formula (13)) and the inventive complex compound (formula (14)) and $(CH_3)_3SiF$ (formula (15)) formed in situ in the electrolyte composition by the reaction of additive A3 and $LiPF_6$. In Table 7 the structures of these compounds are displayed and the different H/F-atoms are denoted $H^a$ to $H^e$ and $F^a$ and $F^b$, respectively as indicated in the 1H/19F NMR spectra in FIGS. 1 and 2. Integration ratios are indicated in parentheses for each atomic species in FIGS. 1 and 2.

TABLE 7

Species found in EL 8 by 1H/19F NMR

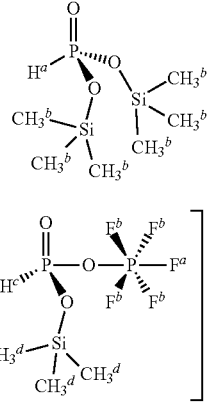

In FIG. 1 the typical upfield shifted signals of a methyl group bonded to a silicon atom is observed for three chemical species. A large P—H coupling can be observed for two chemical species. The more upfield shifted signal is broad indicating a coordinated molecule.

The coordinated $PF_5$ group of the compound of formula (9) exhibits an asymmetric configuration, four F-atoms being in one plane and the fifth is directed vertical on this plane. The $^{19}F$ NMR spectrum in FIG. 2 shows a characteristic coupling between the two non-equivalent fluorine nuclei in the molecule.

A quantitative analysis was performed by determining molar concentrations calculated from the integral of peak signals in reference to the internal standard from the $^1H$ or $^{19}F$ NMR spectrum. The results are summarized in Tables 8, 9, 10 and 11 for different ELY base formulations. "Rel. concentration" was evaluated by comparison of the integrals of $H^b$ (18 H for A3, see formula (13)) vs. Hd (9 H for (14)) in $^1H$ NMR or the integrated signals at −15.08 ppm (A3) and −13.98 ppm (14) in $^{31}P$ NMR.

TABLE 8

Quantification of formation of (14) in EL7 (DEC:EC 70:30, 1 wt. % VC, 1.5 wt. % FEC, 1M $LiPF_6$ + 1 wt. % A3)

| Species | Freshly prepared [mmol/L] | After storage of 1 week [mmol/L] |
|---|---|---|
| Formula (13) (A3) | 27 | 12 |
| Formula (14) based on 1H NMR | 23 | 31 |

TABLE 8-continued

Quantification of formation of (14) in EL7 (DEC:EC 70:30, 1 wt. % VC, 1.5 wt. % FEC, 1M $LiPF_6$ + 1 wt. % A3)

| Species | Freshly prepared [mmol/L] | After storage of 1 week [mmol/L] |
|---|---|---|
| Formula (15) | Not determined | 30 |
| Coordinated $PF_5$ group based on $^{19}F$ NMR | 19 | 31 |

The added amount of additive A3 equaled a concentration of about 53 mmol/L in the electrolyte composition. Right after adding additive A3 to the electrolyte composition the reaction between the $LiPF_6$ and additive A3 started. The reaction continued gradually overtime and also more coordinated $PF_5$ groups were formed. The coordinated $PF_5$ groups are assumed to belong to the complex compound of formula (14).

TABLE 9

Quantification of formation of (14) in EL7 (DEC:EC 70:30, 1 wt. % VC, 1.5 wt. % FEC, 1M $LiPF_6$ + 1 wt. % A3)

| Time | Rel. concentration of A3 | Rel. concentration of (14) based on 1H NMR |
|---|---|---|
| Freshly prepared | 1 | 0.84 |
| After 1 week storage at 25° C. | 1 | 2.48 |

TABLE 10

Quantification of formation of (14) in EL8 (DEC:FEC:FPEE 64:12:24, 1M $LiPF_6$ + 4 wt. % A3),

| Time | Rel. concentration of A3 | Rel. concentration of (14) based on $^1H$ NMR | Rel. concentration of (14) based on $^{31}P$ NMR |
|---|---|---|---|
| Freshly prepared | 1 | 0.10 | 0.10 |
| After 24 h storage at 25° C. | 1 | 0.48 | 0.42 |
| After 4 days storage at 25° C. | 1 | 1.02 | 1.13 |
| After 1 week storage at 25° C. | 1 | 1.32 | 1.32 |

The NMR-signals used for the evaluation shown in Tables 8 to 10 are summarized below.

A3 in EL7 (DEC:EC 70:30, 1 wt. % VC, 1.5 wt. % FEC, 1 M $LiPF_6$, initially 1 wt. % A3)

$^1H$ NMR (400 MHz, $d_6$-DMSO): 6.58 (d, J=723.9 Hz, 1H), 0.03 (s, 18H)

(14) in EL7 (DEC:EC 70:30, 1 wt. % VC, 1.5 wt. % FEC, 1 M $LiPF_6$, initially 1 wt. % A3)

$^1H$ NMR (400 MHz, $d_6$-DMSO): 6.52 (d, J=711.5 Hz, 1H), 0.00 (s, 9H)

$^{19}F$ NMR (367 MHz, $LiPF_6$): −59.55 (ddd, J=734.2, 51.5, 11.7 Hz), −74.26 (dp, J=722.1, 51.6 Hz)

(15) in EL7 (DEC:EC 70:30, 1 wt. % VC, 1.5 wt. % FEC, 1 M $LiPF_6$, initially 1 wt. % A3)

$^1H$ NMR (400 MHz, $d_6$-DMSO): −0.08 (d, J=7.4 Hz, 9H)

$^{19}F$ NMR (367 MHz, $LiPF_6$): −157.11 (m)

A3 in EL8 (DEC:FEC:FPEE 64:12:24, 1 M $LiPF_6$, initially 4 wt. % A3)

¹H NMR (500 MHz, d₆-benzene): 7.05 (d, J=722.2 Hz, 1H), 0.51 (s, 18H)
³¹P{¹H} NMR (202 MHz, LiPF₆): −15.08 (s)
(14) in EL8 (DEC:FEC:FPEE 64:12:24, 1 M LiPF₆, initially 4 wt. % A3)
¹H NMR (500 MHz, d₆-benzene): 7.03 (d, J=714.2 Hz, 1H), 0.48 (s, 9H)
¹⁹F NMR (470 MHz, LiPF₆): −59.42 (ddd, J=732.7, 50.4, 11.6 Hz), −74.25 (dp, J=717.2, 50.4 Hz)
³¹P{¹H} NMR (202 MHz, LiPF₆): −13.98 (h, J=11.9 Hz), −149.53 (h, J=733.0 Hz)
(15) in EL8 (DEC:FEC:FPEE 64:12:24, 1 M LiPF₆, initially 4 wt. % A3)
¹H NMR (400 MHz, d₆-benzene): 0.39 (d, J=7.4 Hz, 9H)
¹⁹F NMR (367 MHz, LiPF₆): −157.43 (m)

When LiBF₄ or LiDFOB were used instead of LiPF₆, a mixture of multiple species containing —OPH(O)OTMS and/or —OPH(O)O— were obtained. The clear determination of the structure of the individual complexes formed via ¹H, ¹⁹F or ³¹P{¹H} NMR was not possible due to overlapping signals. Instead of the evolution of signals of discrete complexes of formula (I) the generation of trimethyl silyl fluoride (15) and the degradation of A3 was used to quantify the formation reaction. The relative ratio of A3 vs (15) were quantified by the comparison of the relevant integrals in ¹H NMR for A3 at 0.63 ppm (s, 18H) and for (15) at 0.52 ppm (d, J=7.4 Hz, 9H). The data is summarized in table 11. Formation of trimethyl silyl fluoride (15) was not observed in case LiFSI was used instead of LiPF₆. FIG. 3 shows parts of the ¹⁹F NMR spectra of EL9, EL10, EL11 and EL12 freshly prepared and after storage for 1 week at 25° C.

A3 in (DEC:EC 70:30)
¹H NMR (400 MHz, d₆-benzene): 7.16 (d, J=716.2 Hz, 1H), 0.63 (s, 18H) (15) in (DEC:EC 70:30)
¹H NMR (400 MHz, d₆-benzene): 0.52 (d, J=7.4 Hz, 9H)

The invention claimed is:

1. A complex compound, wherein the complex compound satisfies formula (I):

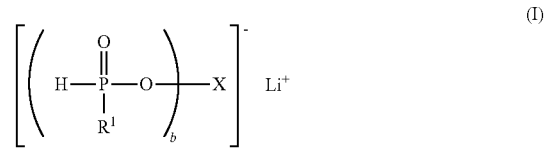

wherein R¹ is selected from H, F, R², OR², OSi(R³R⁴R⁵), and O—X⁻Li⁺;
   wherein R² is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl, which may be substituted by one or more substituents selected from OSi(CH₃)₃ and F;
   R³, R⁴, and R⁵ are independently from each other selected from H, F, R², OR², and OSi(R⁶)₃; and
   R⁶ is independently at each occurrence selected from H, F, R² and OR²; and
X is selected from Y¹(R⁷)$_{4-b}$ and Y²(R⁸)$_{6-b}$;
   wherein Y¹ is B or Al;
   Y² is P, Sb, or As;
   if X is Y¹(R⁷)$_{4-b}$, then b is an integer from 1 to 4;
   if X is Y²(R⁸)$_{6-b}$, then b is an integer from 1 to 6; and
   R⁷ and R⁸ are independently at each occurrence selected from F, R⁹, and OR⁹;
      wherein R⁹ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl, which may be substituted by one or more F;

TABLE 11

Quantification of formation of complexes with various lithium salts

| Electrolyte | lithium salt | Initial molar ratio lithium salt:A3 | Status | Observation |
|---|---|---|---|---|
| EL 9 | 1M LiBF₄ | 100:0 | Freshly prepared | No formation of (15) observed (¹H and ¹⁹F NMR) |
| EL 10 | 1M LiBF₄ | 4:1 | Freshly prepared | Quantitative formation of (15) observed A3 quantitatively converted (¹H and ³¹P NMR) |
| EL 11 | 0.1M LiBF₄ | 1:1 | Freshly prepared | Quantitative conversion of LiBF₄ (¹⁹F NMR) Ratio A3:(15) = 1:12.5 (¹H NMR) |
| EL 12 | 0.05M LiBF₄ | 1:2 | Freshly prepared | Quantitative conversion of LiBF₄ (¹⁹F NMR) Ratio A3:(15) = 1:5.4 (¹H NMR) |
| EL 12 | 0.05M LiBF₄ | 1:2 | Stored 1 week at 25° C. | Quantitative conversion of LiBF₄ (¹⁹F NMR) Ratio A3:(15) = 1:99 (¹H NMR) |
| EL 13 | 0.1M LiDFOB | 1:1 | Freshly prepared | Formation of (15) observed (¹H and ¹⁹F NMR) Ratio A3:(15) = 1:0.03 (¹H NMR) |
| EL 13 | 0.1M LiDFOB | 1:1 | Stored 1 week at 25° C. | Formation of (15) observed (¹H and ¹⁹F NMR) Ratio A3:(15) = 1:0.12 (¹H NMR) |
| EL 14 | 0.1M LiFSI | 1:1 | Freshly prepared | No formation of (15) observed (¹H and ¹⁹F NMR) | one pair of R⁷ or one or two pairs of R⁸ may be combined and jointly be

forming a cycle with Y¹ or Y², respectively; wherein

is a bidentate radical derived from a 1,2-, 1,3- or 1,4-diol, from a 1,2-, 1,3- or 1,4-dicarboxylic acid or from a 1,2-, 1,3- or 1,4-hydroxycarboxylic acid; and R¹ may be combined with one of R⁷ or R⁸, respectively, and jointly form a cycle.

2. The complex compound of claim 1, wherein R⁷ and R⁸ are independently at each occurrence selected from F, OC₁—OC₆ alkyl, and C₁-C₆ alkyl substituted by at least one F, wherein one pair of R⁷ or one or two pairs of R⁸ may be combined and jointly be

forming a cycle with Y¹ or Y², respectively, and/or one or more of R⁷ or R⁸ may be combined with R¹ and jointly form a cycle with the POX-group.

3. The complex compound of claim 1, wherein R¹ is R², OR², OSi(R³R⁴R⁵) or O—X⁻Li⁺.

4. The complex compound of claim 1, wherein X comprises at least one

group derived from oxalic acid, maleic acid, malonic acid, or succinic acid.

5. The complex compound of claim 1, wherein X is B(R⁷)₃.

6. The complex compound of claim 1, wherein X is P(R⁸)₅.

7. A method of producing an electrochemical cell, the method comprising adding the complex compound of claim 1 to an electrochemical cell.

8. The method of claim 7, wherein the complex compound is a cathode active additive.

9. The method of claim 7, wherein the complex compound is an anode active additive.

10. The method of claim 7, wherein the adding comprises generating the complex compound in situ in an electrolyte composition of the electrochemical cell.

11. An electrolyte composition, comprising:
(i) at least one aprotic organic solvent;
(ii) at least one lithium ion-comprising conducting salt;
(iii) at least one complex compound of claim 1; and
(iv) optionally one or more additives.

12. The electrolyte composition of claim 11, which comprises 0.001 to 10 wt.-% of the at least one complex compound based on a total weight of the electrolyte composition.

13. The electrolyte composition of claim 11, which comprises LiPF₆ or LiBF₄.

14. The electrolyte composition of claim 11, wherein the at least one aprotic organic solvent is selected from optionally fluorinated cyclic and acyclic organic carbonates, optionally fluorinated ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles, optionally fluorinated cyclic and acyclic phosphates, and mixtures thereof.

15. An electrochemical cell, comprising:
(A) an anode comprising at least one anode active material,
(B) a cathode comprising at least one cathode active material; and
(C) the electrolyte composition of claim 11.

* * * * *